United States Patent [19]
Owens

[11] Patent Number: 5,900,304
[45] Date of Patent: May 4, 1999

[54] MOLDED WOOD FIBER WEB AND STRUCTURAL PANELS MADE UTILIZING THE FIBER WEB

[76] Inventor: Thomas L. Owens, 631 Sylvan Ct., Batavia, Ill. 60510

[21] Appl. No.: 08/816,664

[22] Filed: Mar. 13, 1997

[51] Int. Cl.⁶ .................................................. B32B 3/28
[52] U.S. Cl. ........................ 428/182; 428/167; 428/183; 428/537.1; 428/184
[58] Field of Search .................................. 428/182, 167, 428/183, 185, 178, 106, 107, 113, 184, 537.1; 52/783.11

[56] References Cited

U.S. PATENT DOCUMENTS

| | | | |
|---|---|---|---|
| 1,875,188 | 8/1932 | Williams | 428/185 |
| 1,987,798 | 1/1935 | Rupprecht | 428/185 |
| 3,574,103 | 4/1971 | Latkin | 428/185 |
| 4,034,135 | 7/1977 | Passmore | 428/184 |
| 4,702,870 | 10/1987 | Setterholm et al. | 264/87 |
| 4,726,863 | 2/1988 | Cline | 156/210 |
| 4,753,713 | 6/1988 | Gunderson | 162/383 |
| 5,198,236 | 3/1993 | Gunderson | 425/80.1 |
| 5,277,854 | 1/1994 | Hunt | 264/86 |
| 5,314,654 | 5/1994 | Gunderson | 264/517 |
| 5,316,828 | 5/1994 | Miller | 428/182 |

OTHER PUBLICATIONS

J.F. Hunt and D.E. Gunderson, "FPL Spaceboard Development", Oct. 27, 1988, pp. 11–17, In *TAPPI Proceedings Of The 1988 Corrugated Containers Conference*, Orlando, Florida, 1988.

*Primary Examiner*—Donald Loney

[57] ABSTRACT

A molded structural-wood-fiber product is disclosed that is formed in three dimensions under conditions of heat and pressure. The molded product has the form of a single-piece wood-fiber web consisting of corrugations having indentations along the ridges of the corrugations on both sides of the web. Sheet facings may be applied to one or both sides of the fiber web to form a stiff, lightweight composite panel that has similar stiffness both along and across the corrugations. Several fiber webs or composite panels may be bonded together in stacked configurations to produce high-strength, light-weight panels, beams or platforms for heavy-duty applications. The unique structure of the three-dimensional fiber web permits straightforward high-speed manufacture using a rigid mold and one-dimensional pressing forces. Specific items that can be manufactured utilizing the fiber web and composite panels include pallets, bulk bins, heavy-duty boxes, shipping containers, wall panels, roof panels, cement forms, partitions, poster displays, reels, furniture, caskets, and doors.

11 Claims, 9 Drawing Sheets

FIG. 4A  FIG. 4C

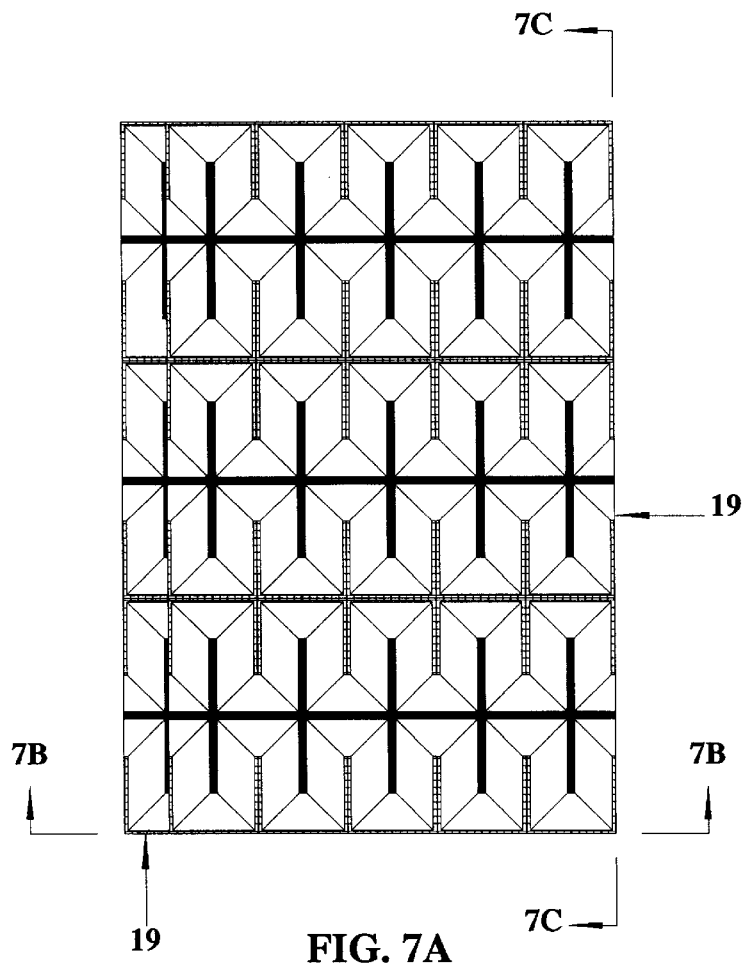
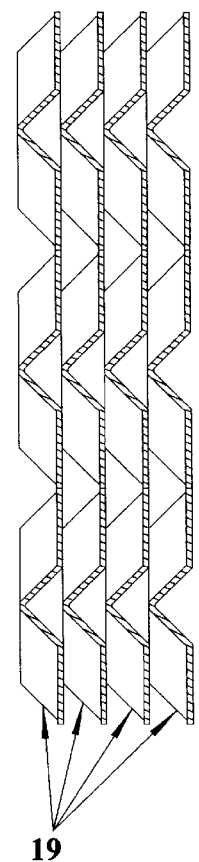
FIG. 7C
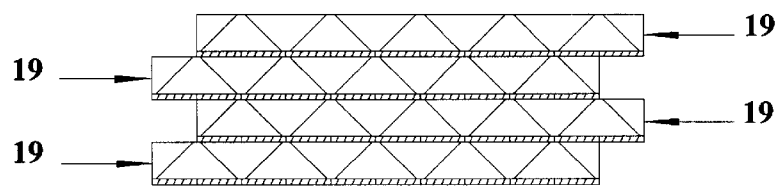
FIG. 7B
FIG. 7A

MOLDED WOOD FIBER WEB AND STRUCTURAL PANELS MADE UTILIZING THE FIBER WEB

FIELD OF THE INVENTION

This invention relates generally to the production of structural-fiberboard products, and particularly to articles of manufacture comprising three-dimensionally molded wood-fiber structures that are utilized in the construction of composite structural-fiberboard panels.

BACKGROUND OF THE INVENTION

A wide variety of forest products are manufactured from wood fibers. The present invention focuses upon a class of wood-fiber products that are molded in three dimensions under conditions of heat and pressure to produce a structural wood fiber web that serves as the principal structural component of composite structural-fiberboard panels. The geometry of the web of the present invention permits the use of straightforward mass-production techniques, utilizing a simple rigid mold that may be pressed together with one-dimensional forces. When the fiber web is bonded to sheet coverings or facings to produce a composite panel product, the composite structure forms a strong, lightweight, rigid three-dimensional truss. The prior art does not disclose a wood-fiber structure of the form of the invention nor does the prior art show fiberboard structures having three-dimensional features that may be so readily mass-produced in a wide range of overall board thickness.

In the prior art, methods and apparatus are disclosed for forming various other fiberboard products having three-dimensional elements. For example, Setterholm and Hunt in U.S. Pat. No. 4,702,870 describe a method and apparatus for forming three-dimensional structural components from wood fiber. Their method and apparatus require the use of a resilient mold insert to form three-dimensional features in the finished fiberboard product. The resilient mold insert is most commonly composed of an array of elastomeric protuberances. The elastomers are attached to a rigid support plate.

Elastomers are weak and difficult to attach firmly to the support plate. In mass-production of wood-fiber products, elastomeric mold elements exhibit problems with compression-set and relatively rapid deterioration under the heat and pressure necessary for product consolidation and drying. As a result, the elastomeric mold elements have a relatively short lifetime and need to be frequently replaced in high-speed production facilities. In addition to short mold lifetimes, the three-dimensional fiberboard objects disclosed in the invention of Setterholm and Hunt are limited to objects having a flat face, backed by webs extending approximately normal to the flat face.

Heat transfer from the resilient mold insert of Setterholm and Hunt to the fiber mat is slow because of the low thermal conductivity of the elastomeric elements of the mold inert and because of long thermal-conduction pathways to regions of the fiber between the elastomeric mold elements. Slow heat transfer results in long drying times within the press, a major problem for this method, particularly for thick products. Drying speed may be increased using radiowave heating of the fiber mat, but this increases the complexity and cost of equipment used to form and dry the fiberboard products.

Thus, the invention of Setterholm and Hunt reveals the structure of a very specific wood fiber product that is formed using a method and an apparatus that are not readily adapted to high-speed mass-production, particularly in the case of thick panel products. As will become apparent in the next several sections, the present invention defines a new fiber structure that may be used in many of the same applications as the invention of Setterholm and Hunt, yet without the drawbacks in product formation and mass-production encountered with the invention of Setterholm and Hunt.

A process for making grids from fibers, described by Hunt in U.S. Pat. No. 5,277,854, also uses the idea of a resilient mold insert which is capable of forming objects in three-dimensions. Because of the use of a resilient mold insert, this invention suffers from the same difficulties as does the invention of Setterholm and Hunt. In addition, while the mold insert of Hunt is capable of generating three-dimensional forces, it is used to generate a fiber product that has generally two-dimensional features only.

In U.S. Pat. Nos. 5,198,236 and 5,314,654, Gunderson and Gleisner describe a method and apparatus that uses a rigid mold to form three-dimensional features in structural fiberboard products. Once again, the fiberboard products disclosed in their patent are limited to flat-faced objects backed by webs extending approximately normal to the flat face. In addition, the rigid mold elements disclosed by Gunderson and Gleisner must be retracted during consolidation of the fiber. In U.S. Pat. No. 5,314,654, a second forming step is required using a resilient mold insert similar to that of Setterholm and Hunt. Therefore, formation of the structural fiberboard product disclosed by Gunderson and Gleisner suffers from the same difficulties as have been pointed out for the invention of Setterholm and Hunt. In addition, the need for retractable mold elements makes this method complex and expensive.

Prior art disclosed in U.S. Pat. No. 5,316,828, by Miller, reveals a reinforced fluted medium and corrugated fiberboard that has increased strength and stiffness in comparison to conventional corrugated fiberboard due to the addition of three-dimensional elements in a simple corrugated fiberboard structure. The three-dimensional elements take the form of adhesive material applied along lines that are transverse to the flutes. The adhesive at least partially fills in and bridges across the valleys of the flutes, holding the corrugated board more rigid under compressive and bending stresses both along the corrugations and across the corrugations.

The invention requires two distinct materials, wood fiber and adhesive, to form the basic structure of the product. The structure of Miller is therefore not formed as a single piece and would require multiple manufacturing steps. In addition, considerable adhesive would be required to fill in the valleys to the top of the flutes. The adhesive could fill in and bridge only a small portion of the flutes in thick corrugated boards, making the technique ineffective for thick corrugated panels. Finally, application of adhesive to both sides of the fluted medium would increase product weight and material cost, and complicate board manufacture.

In U.S. Pat. No. 4,726,863, Cline describes a method for making a high-strength composite paperboard panel. The panel is composed of an undulated midstratum layer to which are adhesively bonded an underlayer and an overlayer. There is no variation of the structure along the flutes formed by the undulations, making the structure generally two-dimensional and placing it in a different structural class than the present invention. Because of its two-dimensional structure, which is similar to the structure of conventional corrugated boards, the panel product disclosed by Cline has less strength and stiffness across the undulations compared to along the undulations.

In summary, numerous composite wood-fiber panel products are described in the prior art. Only a few of these products are comprised of three-dimensional elements which produce fiberboard panels having high strength-to-weight ratios and approximately equal strength and stiffness in all directions within the plane of the panels. The prior art disclosures of three-dimensional elements in fiberboard panels all suffer from significant difficulties in production of thick panels and in mass-production at high-speeds. These difficulties have impeded implementation of much of the prior art by the fiberboard industry and end-users. The present invention overcomes these difficulties by defining a new three-dimensional wood-fiber structure that has excellent strength-to-weight properties, and yet it can be readily mass-produced in the form of both thin and thick panels.

SUMMARY OF THE INVENTION

The invention consists of an article of manufacture having the form of a three-dimensional wood-fiber web that can be produced using a simple rigid mold pressed together with one-dimensional pressing forces. The web serves as a basic structural component for numerous panel products. Examples presented in this disclosure focus upon fiber webs made using a wet-forming process in which the wood fiber is prepared by mixing the fiber with water, thereby forming a slurry. It is to be understood that other fiber preparations are possible, including dry-forming preparations in which adhesive binders are added to relatively dry wood fiber. These other preparations will present themselves to those skilled in these arts.

The fiber web is formed as one piece under heat and pressure after most of the carrier fluid is drained or squeezed from the slurry as the rigid mold is pressed together. Once formed using the rigid mold, the fiber web contains corrugations that have syncline (V-shaped) indentations along the ridges of the corrugations on both sides of the web at spaced positions along the ridges of the corrugations. The opposite surface of the indentations form anticline (inverted V shaped) protrusions that function as corrugation stiffeners bridging across furrows of the corrugations. These elements produce sloped web surfaces. The valleys and ridges of these elements may be flat. Flat ridges provide an exterior surface for the application of adhesives that bond the web to additional components. Surfaces that are either sloping or flat allow formation of the web using a simple rigid mold that is pressed together using a one-dimensional pressing force.

In structural panel applications, sheets of material are adhesively bonded to the flat ridges of the shaped web on one or both sides of the web, providing smooth facings which cover the web. The web thereby serves as a stiff, light-weight structural core which is sandwiched between sheet facings to form a composite panel. The sheet facings may be composed of a variety of materials including pressed fiberboard, wood veneers, metal, plastic, and the like. The combined structure, consisting of the three-dimensional web bonded to sheet material, forms a three-dimensional rigid truss that has a high strength-to weight ratio, and produces nearly equal strength and stiffness in all directions within planes that are parallel to the facings.

Numerous other structures are possible by combining elements of the invention in various ways. For example, individual shaped webs may be joined in stacked arrays to increase strength and stiffness. Sheet materials can be joined to the ridges of the exterior webs of these stacked arrays to form stiff but lightweight platforms, panels, or beams having smooth exterior surfaces. Sheet materials may also be bonded between each web in stacked configurations to simplify adhesive attachment of the various layers and increase product strength and stiffness. The edges of stacked arrays may be used as the load bearing elements in some applications where very high stiffness and compression resistance are required.

The various embodiments of the invention have applications in a wide range of industries including packaging, material handling, construction, and furniture industries. A few of the specific products that can be fashioned using the invention include pallets, bulk bins, heavy duty boxes, shipping containers, wall panels, roof panels, cement forms, partitions, poster displays, reels, desks, caskets, shelves, tables, and doors.

ADVANTAGES OF THE INVENTION

Unlike the prior art, the present invention discloses a three-dimensional fiber-web structure that can be readily produced to any practical size as a single piece under heat and pressure using rigid molds that are pressed together in one direction. The molded fiber web can be easily bonded to a variety of sheet materials or to other webs to form numerous rigid structural fiberboard panels that have high strength-to weight ratios relative to solid panels having comparable overall dimensions. In one of the preferred embodiments, the three-dimensional features of the web impart nearly equal strength and stiffness in all directions within the general plane of the panels.

In production of the fiber web, many types of wood fibers and combinations of wood fibers may be utilized ranging from 100 percent softwood fiber to 100 percent hardwood fibers, including all of the various combinations of mixed hardwood and softwood fiber. Hardwood fibers are normally difficult to work with, but by holding the fiber mass together under heat and pressure as the fiber web dries, strong fiber bonds are formed even for hardwood fibers.

Strong fiber bonds can be formed using the aforementioned press-drying procedure without the need for additive binders. The absence of additive binders allows the fiber webs to be readily recycled. In many applications, discarded products made in accordance with the present invention can be recycled along with other common corrugated containers. The fibers, either hardwood or softwood, can be derived from any sort of secondary quality raw material source such as small trees, misformed trees, limbs, underutilized wood species, recycled paper and cardboard. This is an important advantage with regard to efficient utilization of forest resources.

The sheet facings bonded to the web may be composed of a variety of sheet materials including wood veneers, fiberboard, plastics and metals. Because the sheet facings are produced separately from the structural web, the physical properties of the web may be controlled independent of the physical properties of the sheet facing. Independent control enhances the versatility of the invention. For example, density of the web may be adjusted relative to the density of any fiber sheet facing so that strength of each element may be matched to achieve optimum strength-to-weight ratios.

In the invention of Setterholm and Hunt, density of the structural-support web relative to the density of the facing was more difficult to control, since the forces forming the support web were not independent of the forces forming the facing. In early tests of thick products, the density of the support web was found to be much lower than the density of the facing, leading to poor crush resistance relative to product basis weight.

The particular geometry of the present invention is designed to permit the use of a simple rigid mold which is part of a relatively simple, highly-reliable molding system. The mold elements do not need to be retracted during formation, as in the prior art. Since the mold elements are rigid they can be composed of various metals, such as stainless steel or aluminum. They may even be composed of any of a variety of common high-strength, high-temperature, durable non-metals, such as aluminum oxide. In some applications, various plastics or plastics reinforced with fillers may be used.

Unlike the prior art, mold elements utilized to produce the present invention can be firmly and reliably attached to support members using straightforward mechanical attachments, or through welding or brazing if the mold elements are metallic. In many cases, mold elements may be readily machined directly into a mold support plate, forming a very strong, durable one-piece mold plate. Relative to the resilient mold insert disclosed in the prior art, the rigid mold of the present invention will have a very long life expectancy. It will offer trouble-free performance in production applications, minimizing machine maintenance requirements and downtime.

The sloped surfaces and flat valleys and ridges of the fiber web permit the application of three-dimensional forming forces using a rigid mold that is pressed together in one direction. In addition to vertical forces developed as the mold plates are pressed together, lateral forces result from the outward swaging that occurs as the sloped surfaces of the molds are pressed together. This aspect of the invention has an enormous advantage since it is straightforward to make molds that are pressed together in one direction. Experimentation has confirmed that mold surface angles may be found that produce uniform, high-density webs. Experimentation has also determined that the webs have excellent release properties upon separation of the molds. Prior art required a resilient mold insert in order to produce three-dimensional forming forces from a one-dimensional pressing force.

As mentioned previously, the rigid mold of the present invention can be metallic. A metallic mold may be actively and effectively heated with common heating sources such as steam, electric or gas heat. The metallic mold surfaces are in close contact with every surface of the web during web formation. Very rapid and efficient heat transfer from actively heated metallic molds to all regions of the fiber web will therefore occur. The web can thereby be rapidly dried and/or bonding agents rapidly cured as the web is pressed and heated simultaneously. High product throughputs are then possible. Relatively inexpensive sources of heat may be used and means for actively heating the molds readily applied.

In the prior art, heat transfer rates across elastomeric mold elements were slow due to the low thermal conductivity of elastomers. In addition, heat conduction paths from heated metal surfaces of the mold to regions of the fiber between elastomeric mold elements were relatively long, particularly for thick products. Long heat conduction distances contributed to slow heat transfer rates. In this circumstance, rapid fiber-drying rates and high product throughput could be achieved only through the implementation of costly techniques such as radiowave heating or parallel processing. Only thin panels could be efficiently mass-produced because of the slow heat transfer rates and associated slow drying rates of thick fiber-panel products.

Production of the fiber webs disclosed herein may be accomplished in a variety of ways. Webs can be formed one at a time in batch operations using a single mold in a single opening press. Several webs may be produced simultaneously using several molds arranged in a stacked configuration in a multi-opening press. The webs can also be formed continuously using moving molds on continuous belted presses or counter-rotating roller presses, or the like. It is to be understood that other production techniques will present themselves to those skilled in the art. In addition, while the focus of the present invention is upon formation of fiber webs that use a fluid carrier to mix and deposit the fibers in the mold, the invention also applies to the formation of fiber webs using adhesive-coated dry-fiber furnish, as mentioned previously.

BRIEF DESCRIPTION OF THE DRAWINGS

The invention will be better understood with reference to the accompanying drawings, also forming part of this disclosure, wherein:

FIG. 7 shows a top view (7A), end view (7B), and side view (7C) of a plurality of fiber webs stacked and bonded along ridges to form a thick, rigid fiber structure. Each web in the stack has the form of the second embodiment of the web, shown in FIG. 5. Other web embodiments may also be used in stacked configurations.

DETAILED DESCRIPTION OF THE PREFERRED EMBODIMENTS

Figure 1:
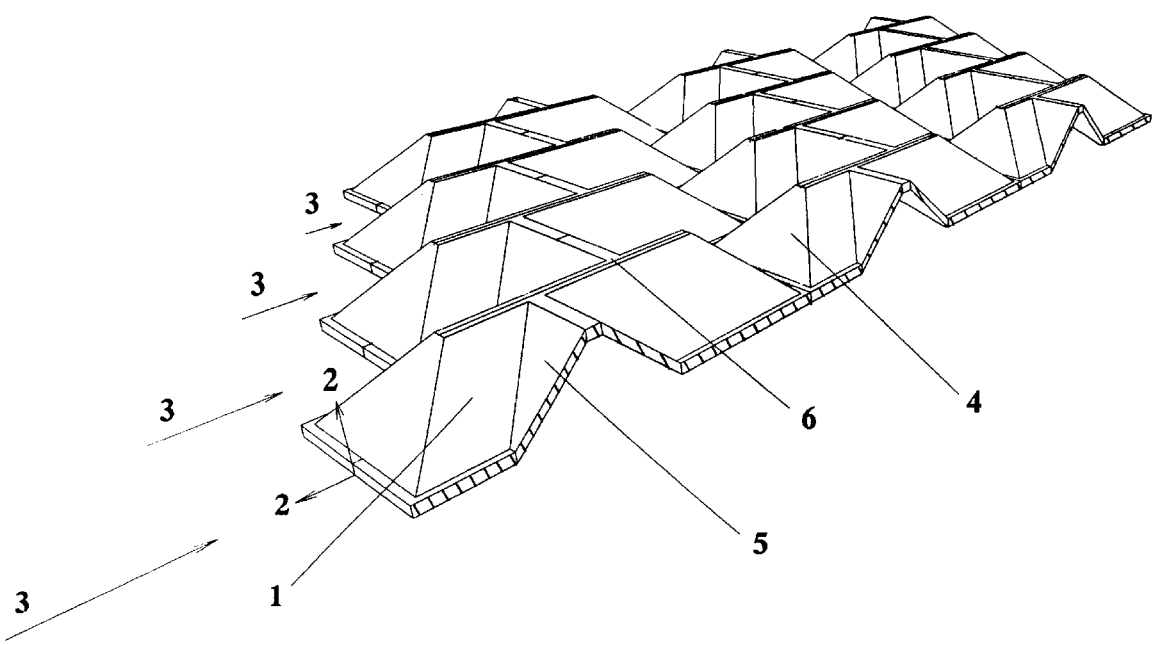
FIG. 1 is a perspective rendering of a first embodiment of the molded fiber web showing the corrugations and syncline indentations on one side of the web with indentations staggered along adjacent ridges of the corrugations.
Figure 2:
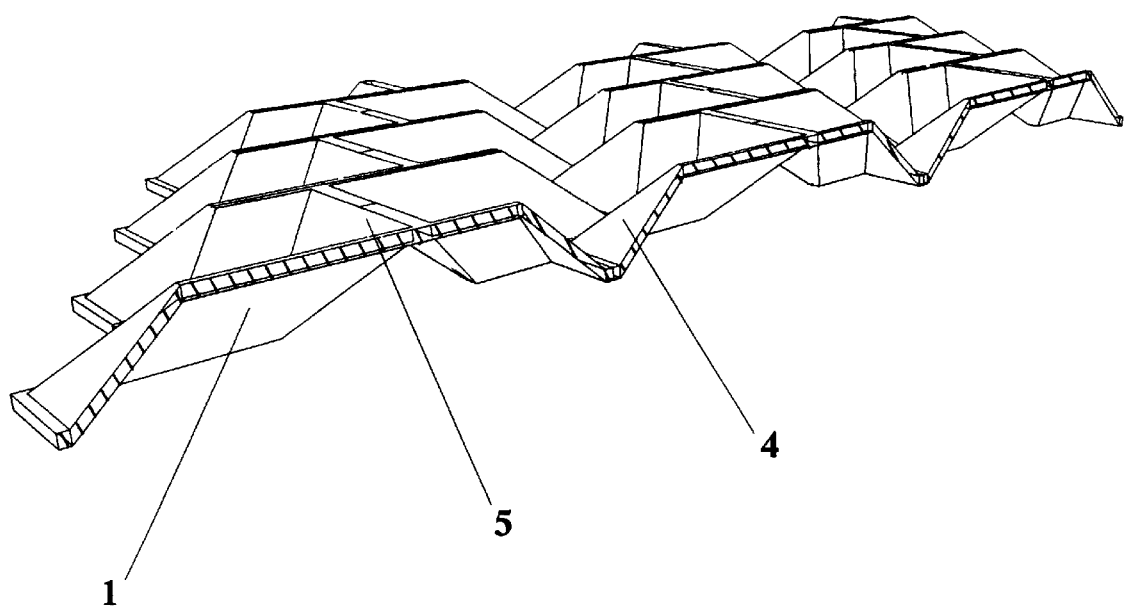
FIG. 2 is an additional perspective view of the fiber web revealing a cutaway section through the ridge of the front corrugation of the web shown in FIG. 1.
Figure 3:
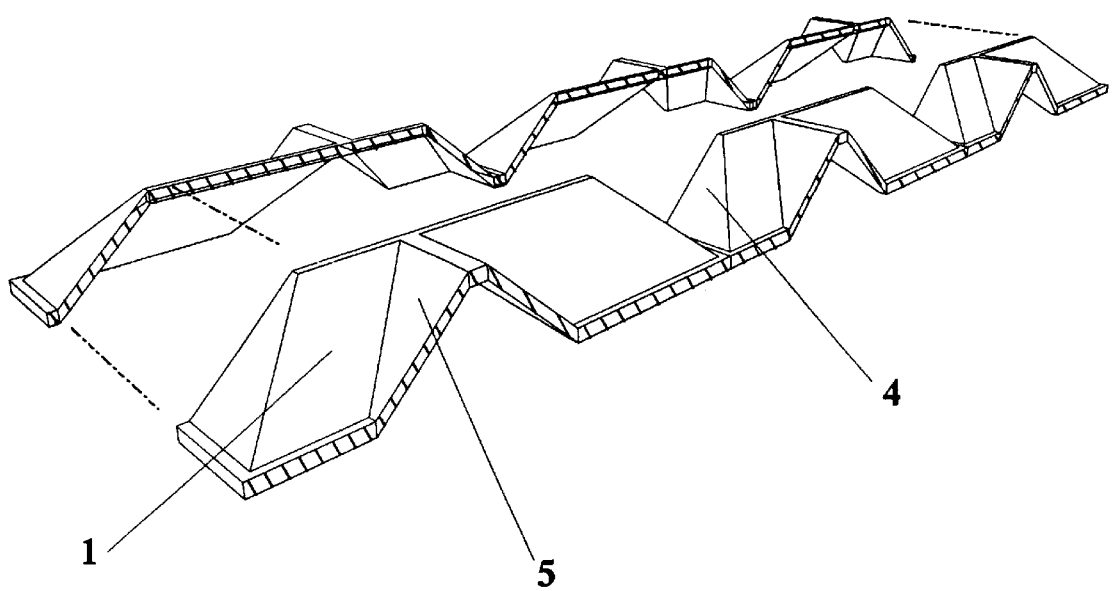
FIG. 3 is a perspective rendering of a break-away of a single corrugation of the fiber web depicted in FIG. 1, where the corrugation is sectioned along a plane through the peak or ridge of the corrugation.

FIGS. 1–3 illustrate one embodiment of the invention. Perspective renderings of different views of the embodiment are shown in these first three figures to clarify the basic structure of the invention. The structure depicted in FIG. 1 shows an upper surface view of the pressed-fiber web consisting of a series of undulations or corrugations 1 along which are numerous V-shaped openings (referred to hereinafter as syncline indentations 4) downward into the ridges of the corrugations and other numerous inverted-V-shaped protuberances (referred to hereinafter as anticline protrusions 5) upward from the valleys of the corrugations. The anticline protrusions 5 may have the same height as the corrugations, as shown in FIG. 1, or they may be set back from the ridges of the corrugations.

The direction of the axes of the corrugations are indicated by the arrows 3 in FIG. 1, for reference. For webs that are formed about a plane, the midplane of the web may be defined as a horizontal plane which passes through the middle of the structure in the narrow overall height dimension. The midplane is generally normal to the direction in which force is applied to form the web.

The direction of the valleys of the syncline indentations 4 and the ridges of the anticline protrusions 5 are approximately normal to the axes of the corrugations in the figures. Other relative angles may be used if desired. The anticline protrusions 5 are formed by indenting the valleys of the corrugations from the underside of the structure shown in FIG. 1. In this sense, both the syncline indentations 4 and the anticline protrusions 5 are indentations into corrugation ridges made in the same fashion but from opposite sides of the fiber web structure.

The walls formed by the syncline indentations 4 and anticline protrusions 5 span or bridge the space between adjacent walls of the corrugations. By bridging this space, the syncline indentations 4 and anticline protrusions 5 act as a type of gusset or stiffener for the corrugations 1. They also provide strength and stiffness in directions normal to the axes of the corrugations. A fiber web fashioned in this manner holds its as-molded form without the need for additional support. The self-supporting feature of the fiber web in the present invention makes assembly into stacked configurations very simple and convenient. The self-supporting feature also allows the invention to be used in the as-molded condition, which would be useful in some packaging applications.

The peaks or ridges 6 of the structure on both the top and bottom surfaces of the web may be flat. These flat features along the ridges form surfaces that are convenient and effective sites for the application of adhesives used to bond the structure to various types of sheet coverings or facings, or to bond several webs together to form stacked configurations. As depicted in FIG. 1, these flat-topped ridges may consist of peaks or ridges of the anticline protrusions 5 in addition to peaks or ridges of the corrugations 1.

FIG. 2 provides another perspective drawing of the first embodiment. In this case, the structure shown in FIG. 1 has been sectioned along plane 2—2 in FIG. 1 to reveal some of the features of the cross-section and the underside of the structure. FIG. 3 is another perspective drawing showing a single corrugation that has been split apart at a plane through the middle of the corrugation. The formation of the anticline protrusions 5 by indentation of the valleys of the corrugations is clarified by this rendering of the structure as well as the rendering shown in FIG. 2. It is clear from FIGS. 2 and 3 that the structure is a relatively thin three-dimensional web having sloping surfaces and flat ridges.

The topology of the structure of the present invention permits formation of the three-dimensional web as a single continuous piece in a single molding operation using a simple rigid mold that is pressed together with one-dimensional forming forces. The top and bottom mold surfaces used to form the present invention contain negative impressions of the top and bottom surfaces, respectively, of the structure. Unidirectional mold pressure is applied in a direction generally normal to the planar axis or midplane of the web structure.

The ability to form the fiber web as a single piece in a single molding step using a rigid mold can be understood in mathematical terms that characterize the web surfaces as single-valued functions of coordinates of the midplane of the structure. No part of the web is therefore intersected more than once as the mold moves towards the web in its finished form. In simpler terms, no part of the web folds back on itself or has hollow regions, which would otherwise make rigid mold access impossible in a single molding step to form a single continuous web.

Just as the angled or sloped surfaces of the web permit ready formation of the three-dimensional web structure, they also permit ready separation of the mold from the web after formation of the web. Experiments to be described later have demonstrated excellent mold-release properties, confirming this advantage. In the prior art, formation of three-dimensional features required fragile and expensive elastomeric molds or the use of multiple components or materials, and multiple manufacturing steps, as has already been described.

The fiber furnish, from which the fiber web is formed, can be prepared a number of different ways. For example, the furnish can be prepared from a mixture of wood fiber and a carrier fluid, such as water. Agitation of the mixture produces a slurry having a reasonably uniform distribution of wood fiber. Usually, the carrier fluid makes up most of the slurry. The agitated slurry is poured into a deckle which encloses the mold. The carrier fluid is drained through porous openings in the molds and is driven out by gravity forces and differential pressure applied to the molds.

After most of the water is removed from the slurry through drainage and compaction, heat is applied to the web through thermal conduction from heated mold surfaces in order to remove the remaining water and dry the web under pressure. Radiowave energy may also be applied to the web in order to heat the web and increase drying speed. For thin fiber webs, however, increases in drying speed produced with radiowave heating may be only marginal. This is because heat from the mold surfaces is already rapidly transferred throughout the volume of the fiber web, due to the short heat conduction paths in thin webs.

FIG. 4A shows a top view of a three-dimensional fiber web that is similar to the web depicted in FIGS. 1 and 2. In this case, a little larger web is shown having more indentations and protrusions. The top view shows a skewed shape intentionally, in order to clarify the web structure or pattern. The web can be made to have a rectangular perimeter or any other perimeter shape by trimming the edges or forming the web with the desired perimeter shape.

In FIG. 4A, the flat-topped ridges 7 of the structure are represented by the heavy black lines in the top view, while the flat-bottomed valleys 8 are represented by the hatched pattern in the top view. As already mentioned in connection with FIGS. 1–3, the flat portion of the ridges 7 forms an excellent surface for applying adhesive used to bond the web to facings or other fiber webs. The thin angled lines in the top view are the edges of syncline indentations into the paper and anticline protrusions out of the paper. Thus, the diamond shaped elements in FIG. 4 containing hatched horizontal lines represent syncline indentations 9, while those containing heavy solid lines represent anticline protrusions 10.

Figure 4B:
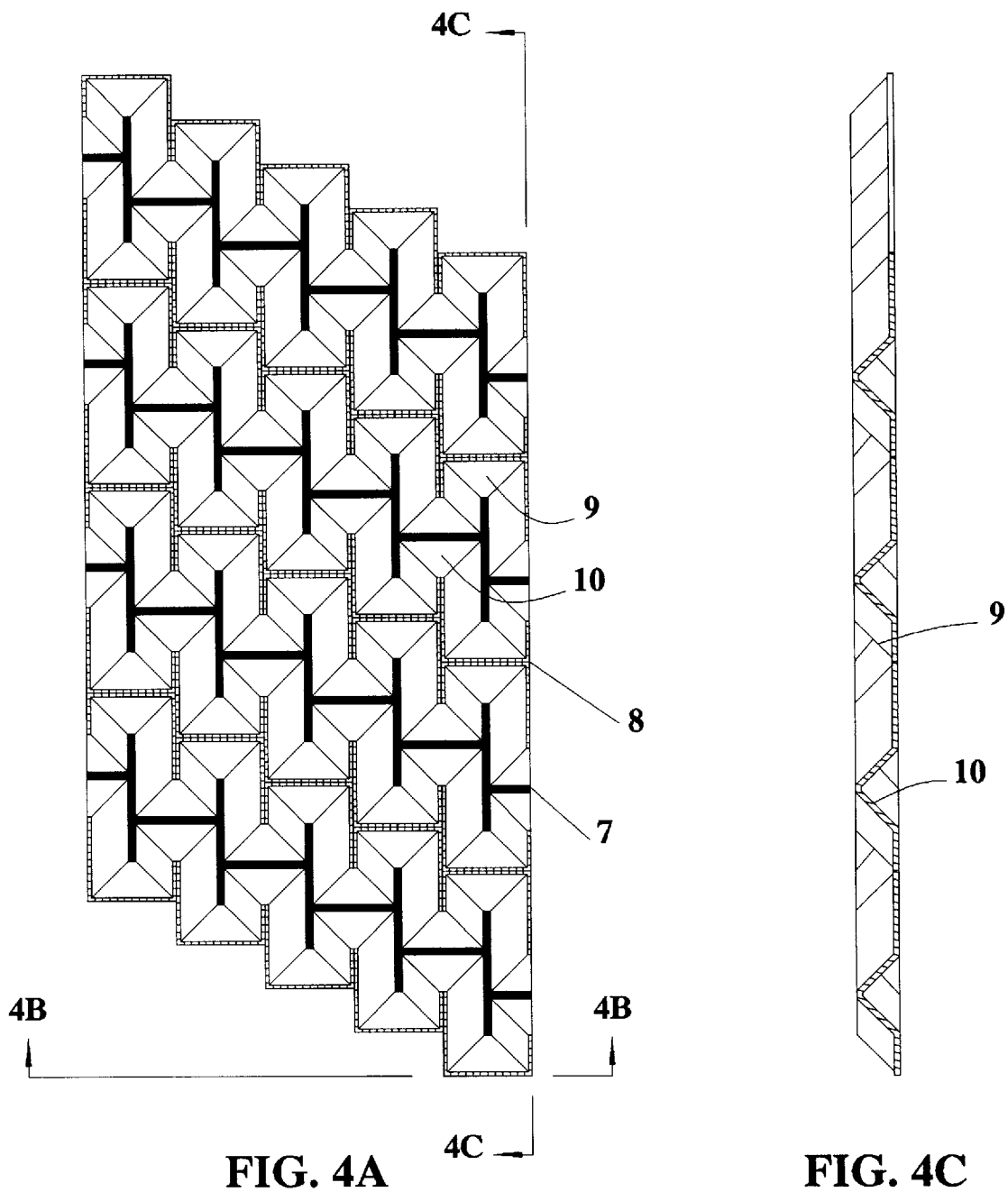
FIG. 4 presents a top view (4A), end view (4B) and side view (4C) of a fiber web having staggered syncline indentations and anticline protrusions between the corrugations.

FIG. 4B shows a lower-edge view of the structure depicted in FIG. 4A. The view presented in FIG. 4B is indicated by cross section 4B—4B in FIG. 4A. An end view of the corrugations 11 and the sides of the anticline protrusions 10 are visible in this view of the invention. FIG. 4C shows a right edge view of the web showing yet another view of the syncline indentations 9 and anticline protrusions 10. The right edge view in FIG. 4C is indicated by cross section 4C—4C in FIG. 4A.

Figure 4B:
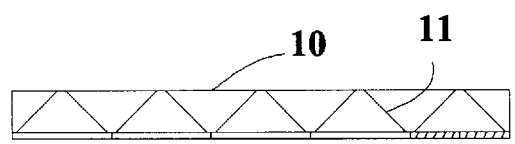

In the embodiment depicted in FIG. 4, the positions of the syncline indentations 9 and the anticline protrusions 10 are staggered along adjacent corrugations. By staggering these elements, bending strength and stiffness may be imparted to the structure both along the corrugations and across the corrugations.

Figures 5A, 5C:
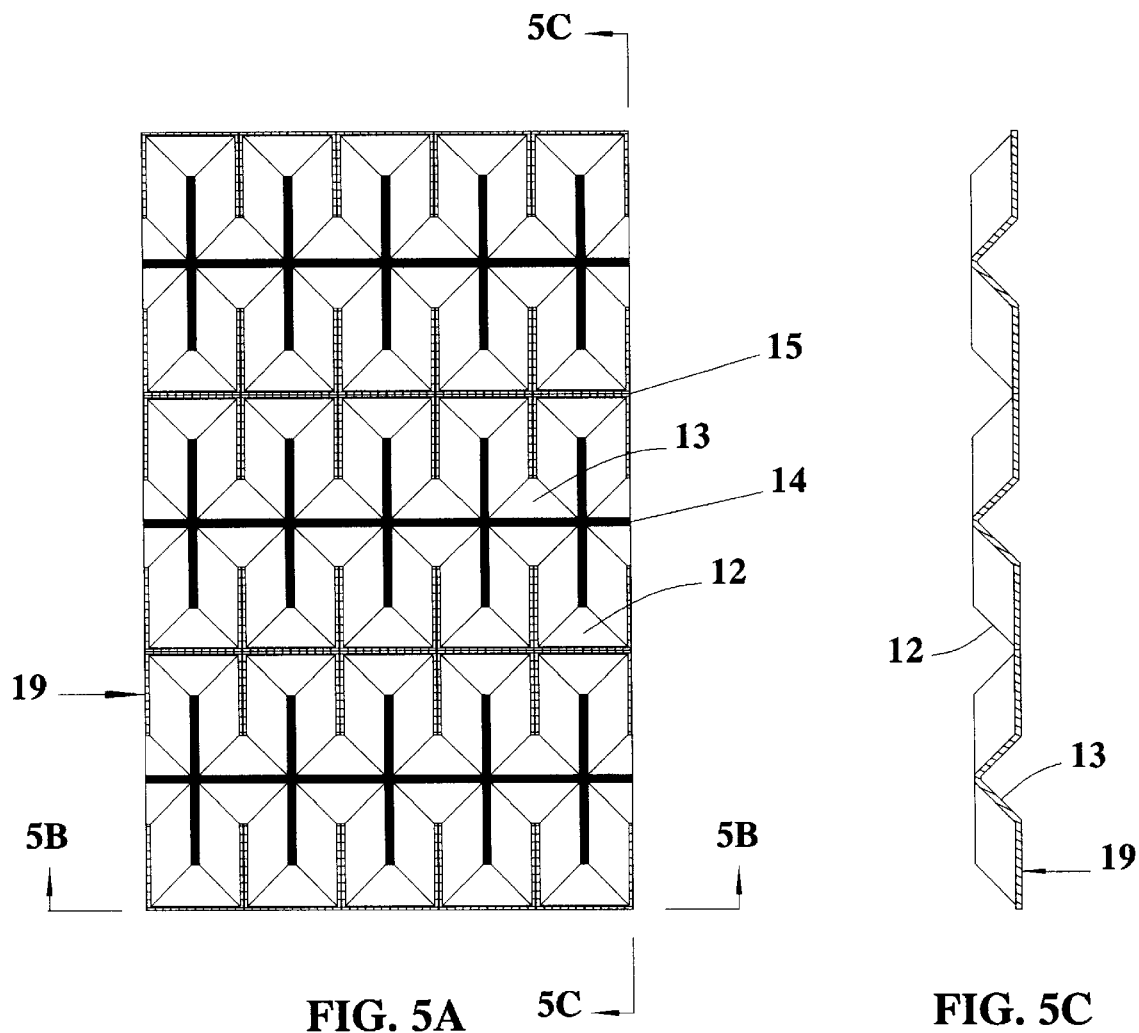
FIG. 5 shows a top view (5A), end view (5B), and side view (5C) of a second embodiment of the invention showing the syncline indentations and anticline protrusions lined up across the web.
Figure 5B:
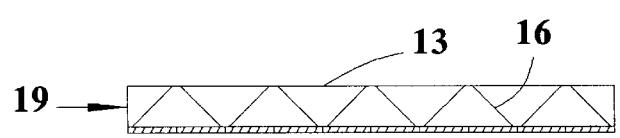

FIG. 5A is a top view of a web in which syncline indentations 12 and anticline protrusions 13 are lined up in a direction normal to the corrugations to facilitate bending or folding of the web across the corrugations. A lower edge view of this embodiment is shown in FIG. 5B and a right edge view is shown in FIG. 5C. The topology of this particular embodiment of the invention permits the use of molds that can be readily machined on three-axis milling machines from a single piece of rigid material. Somewhat greater distances are shown between the indentations and protrusions in FIG. 5, compared to FIG. 4, to illustrate the fact that the spacing and position of the syncline indentations 12 and anticline protrusions 13 can be varied. The appropriate positions and spacing will be determined by product application requirements such as strength across the corrugations, economics of mold fabrication, final product shape, and end use.

The ability to fold or bend the web is an advantage in numerous applications. For example, in the manufacture of boxes, the web may be folded at the corners and subsequently covered with a facing to produce a smooth surface. Box assembly in this sequence is greatly facilitated by the fact that the webs are self-supporting in the as-molded condition. Either stiff sheet materials, such as wood, metal and hard plastics, or more flexible sheet materials, such as thin fiberboard or paperboard, may be applied to the web to form the box surface in this case. Using a different assembly sequence, folding may be performed after the facing is applied to the web, as is done in conventional corrugated board manufacture. In this case, the facing must be flexible in order to allow the facing to be creased along the fold line prior to bending.

It is also possible to form a fiber web composed of staggered indentations and protrusions over most of the area of the web except along predetermined fold lines. Along these fold lines, the indentations and protrusions would be lined up. Using a combination of linear and staggered web features, readily folded panels may be produced that are rigid both along the corrugations and across the corrugations. Panels assembled from the webs may be subsequently folded or shaped in various predetermined ways to produce a wide variety of products.

Figure 6:
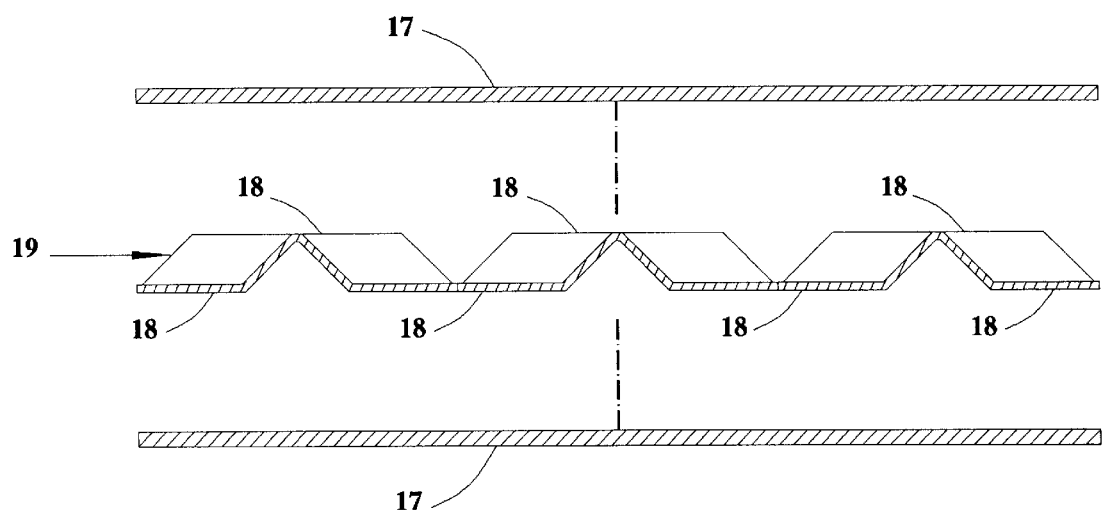
FIG. 6 shows a panel embodiment having sheet facings bonded to the ridges of the fiber web forming a rigid three-dimensional truss structure.

FIG. 6 illustrates an example of smooth, flat-surface sheets 17 that may be bonded to the ridges 18 of the fiber web 19. In this example, a web 19 like that illustrated in FIG. 5 is drawn. The composite structure becomes a flat surface panel with a fiber web 19 backing or core. The sheet material 17 applied to the web 19, spans the gap across the tops of the syncline indentations 12, forming a rigid three-dimensional truss. The three-dimensional truss formed in this way imparts considerable stiffness to the composite panel.

The smooth surface sheets 17 applied to the web provide excellent surfaces for printing and displaying text and graphics, useful for conveying information and advertising. Printing may be performed either before or after the sheets are joined to the web. While shown as a generally flat panel in FIG. 5, curved shapes are also readily produced by forming or bending the web 19 in an arc and bonding flexible sheets to the web 19 so that the sheets follow the curvature of the fiber web 19.

For any of the embodiments of the fiber web, many different materials may be used in the sheet facing. For example, the facings may consist of wood veneers, sheets of wood-fiber-based material, wood-based-particle panel materials, plastic or metal sheets. Other sheet materials will present themselves to those skilled in these arts.

FIG. 7A is a top view of an embodiment in which several individual fiber webs 19 are bonded together in a stacked configuration. FIG. 7B is a bottom edge view of the stack of webs and FIG. 7C is a right edge view of the stacked web. The webs 19 may be readily bonded along the surfaces formed at the ridges 14 of the individual webs 19. By staggering the webs 19 as shown in the edge view of FIG. 7B, the gaps at the top of the syncline indentations 12 are bridged by stiff portions of the ridges 14 of adjacent webs 19. In this way, the structure becomes a complex rigid three-dimensional truss having considerable stiffness in all directions. Stiffness is attained in this case without the use of sheet facings.

Even webs made with indentations that are lined up, as in FIG. 5, may be made stiff in all directions, including across the fold-line of the indentations, by stacking the webs. This is because the stiff bridges formed across the gaps of the indentations in properly stacked configurations, resist closure of the indentations under bending forces. Thus, the simplifications produced by lining up the indentations in the webs, discussed in conjunction with FIG. 5, may be realized, yet stiffness is maintained both along and across the corrugations in these stacked configurations.

For a given panel thickness, stacked-web embodiments of the invention generally have better thermal insulating properties than do panels consisting of only a single large web. This advantage is due primarily to the separation or partitioning of air spaces through the thickness of the stacked web. By partitioning the air spaces, circulating air currents are broken up and isolated from each other. Heat transfer through the thickness of the stacked web due to heat convection along these air currents is thereby minimized.

While not shown in FIG. 7, sheets of material may also be applied between webs 19 within the stack of webs. This additional layering of sheet material imparts additional strength and stiffness to the composite panel and increased convective heat-transfer resistance across the panel. Increased convective heat-transfer resistance results from further separation and partitioning of the air spaces within the stacked web in these embodiments.

As an additional benefit of adding sheet materials between the webs 19 in stacked configurations, adhesive bonding of the various layers is simplified. This advantage arises because the sheets provide broad bonding surfaces. In this circumstance, adjacent layers of the stack do not need to be positioned as accurately as is necessary without the sheet layers. Without the sheet layers, web ridges, 7 and 14, must be carefully aligned before they are bonded.

Figure 8:
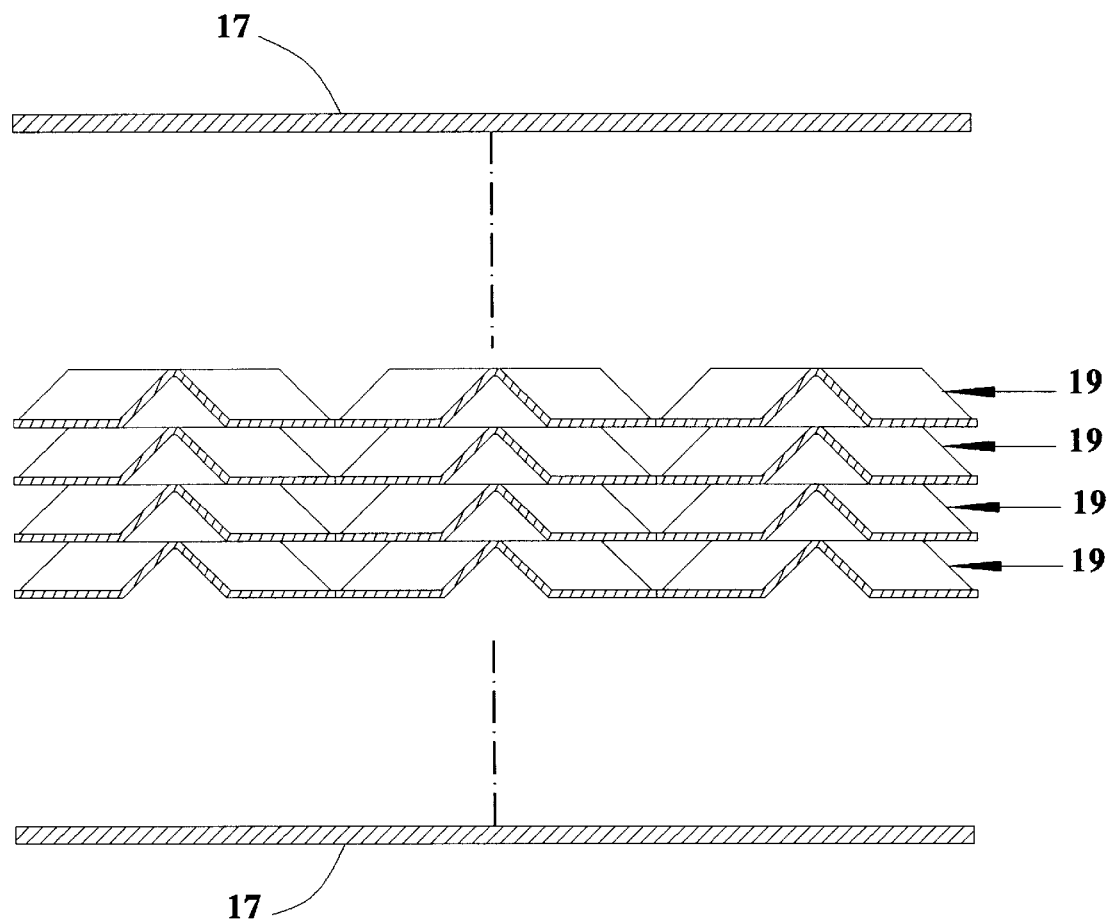
FIG. 8 is an assembly drawing of the stacked web of FIG. 7 and sheet facings that attach to the exterior ridges of the outer webs to form a rigid structure with flat exterior surfaces.

FIG. 8 depicts the application of sheet facings 17 to the ridges 14 of exterior webs of the stacked configuration, to give the stack greater stiffness and a smooth surface. Once again, sheets may or may not be placed between webs 19 within the stack, depending upon the application.

Figure 9:
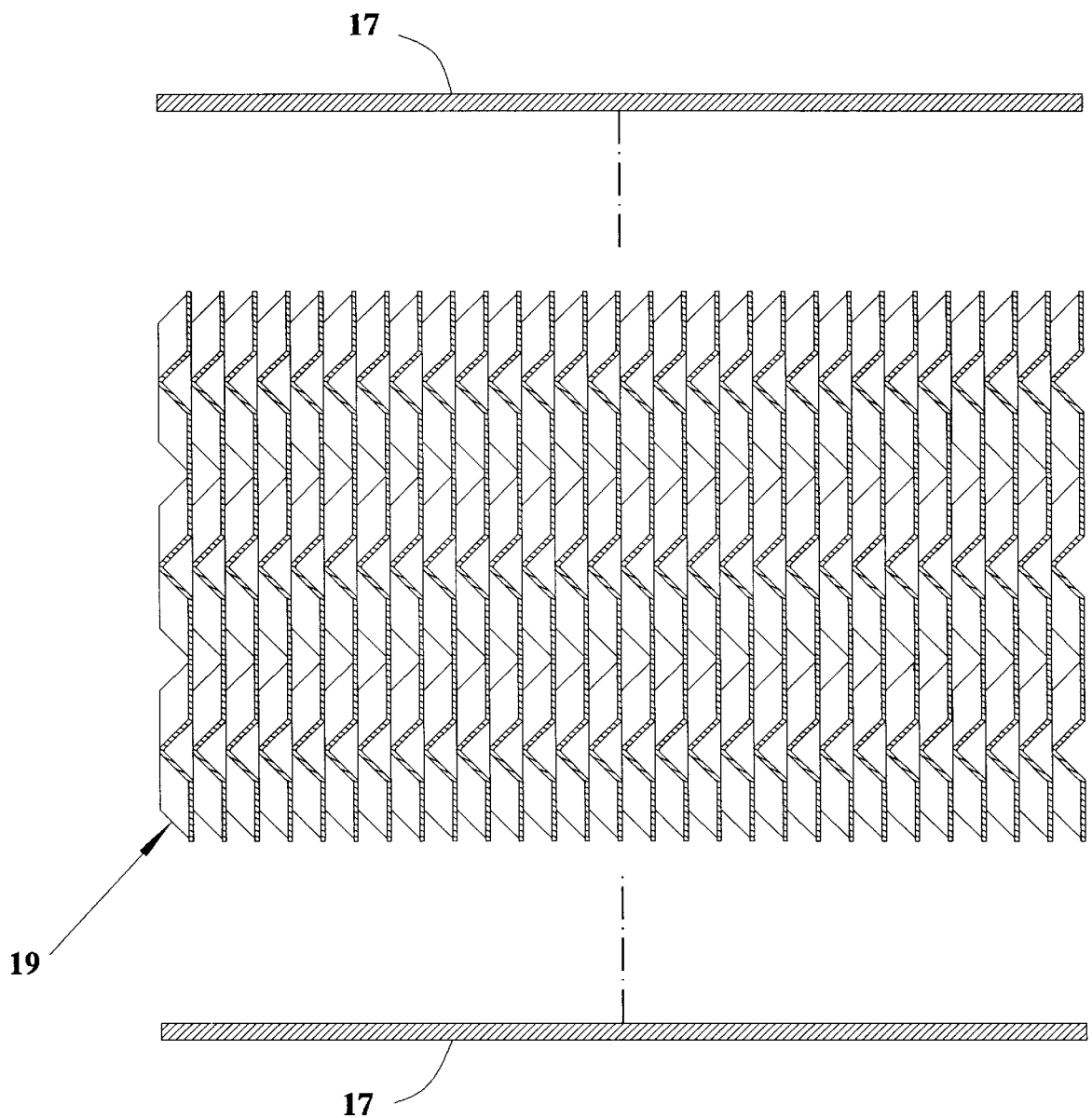
FIG. 9 shows a panel product made by stacking the webs horizontally using relatively large numbers of web sections, and then bonding sheet facings to the vertical edges of the stacked webs. Individual webs shown in the stack in FIG. 9 have the same form as the second embodiment of the web, shown in FIG. 5. Other web embodiments may also be used in stacked configurations.

FIG. 9 shows an embodiment in which numerous webs 19 are stacked horizontally. In this case, sheet facings are applied to the edges of the stack rather than to the exterior web ridges 14. For this configuration, individual webs would typically have a narrow width (height dimension in FIG. 9) relative to web overall length (dimension into the paper in FIG. 9). The stacked web and sheet facings depicted in FIG. 9 would be useful in the formation of relatively thick beams and platforms in which heavy loads are applied to the edges of the webs 19. In addition, sheet coverings along the edge of stacked panels would keep debris from entering the stack of webs.

Once again, sheet materials may be placed between webs within the stack shown in FIG. 9 to impart additional strength and stiffness to the composite structure. While not shown in FIG. 9, sheet facings may also be readily applied to the edges of the composite panel at the right, left and facing views of the structure depicted in FIG. 9. With the addition of these sheet facings, the composite panel would be completely enclosed on all sides by smooth facings.

It is also possible to nest the fiber webs. By bonding multiple webs together in nested configurations, the strength and stiffness of the webs can be substantially increased compared to the strength and stiffness of a single web. Nesting permits web thickness, strength and stiffness to be varied over a wide range using only a single web configuration and a single forming apparatus.

The invention in its various forms can be used to make a wide variety of structural products in packaging, material handling, construction and furniture industries. Products include pallets, bulk bins, heavy duty boxes, shipping containers, wall panels, roof panels, cement forms, partitions, poster displays, reels, desks, caskets, shelves, tables, and doors. Other applications will present themselves to those skilled in the art.

The invention can be formed from wood fibers of all types. It can be formed with wood fiber alone, containing no chemical additives, making products easily recyclable. It can also be formed with resin or binder additives to enhance properties, although these products may not be recyclable. The invention can also include various other additives and treatments to impart specific properties to the structure such as resistance to water, fire, and insects. Other additives and treatments will present themselves to those skilled in the art.

An experiment was conducted during the development of the invention to determine the viability of forming a fiber web of the type disclosed herein using a solid mold and a one-dimensional pressing force. For these experiments a fiber web having staggered syncline indentations and anticline protrusions, similar to the web depicted in FIGS. 1–4, was fabricated. Other experimental parameters are listed below:

1. The corrugation and indentation surfaces sloped at angles of 45 degrees with respect to the midplane of the web.
2. The perimeter of the web was rectangular, with overall dimensions 12.5 cm×10 cm×1 cm.
3. The web consisted of five adjacent corrugation sections, each section having a form similar to that shown in FIG. 3.
4. Each corrugation section contained either 2 or 3 syncline indentations and 2 or 3 anticline protrusions along the length of the corrugation section.
5. The ridges of the web were flat with a width of 0.18 cm.
6. The rigid mold plates were fabricated from aluminum.
7. A series of small holes were placed along the valleys of the pattern in the mold plates to permit removal of water and venting of steam during drying.
8. Fibers were derived from macerated corrugated boxes. A ratio of approximately 1 part fiber to 100 parts water, by weight, was utilized in the maceration process.
9. Pressures of approximately 200 PSI were applied to the mold plates during formation and drying of the fiber webs.
10. Mold surface temperatures during drying reached approximately 325 degrees F.
11. Final web densities were 900–1000 kilograms per cubic meter.

In the experiments, the fiber webs were formed and dried in the same mold apparatus without removing the webs until they had dried completely. After the webs were dry, they released quite readily from the mold surfaces as the mold plates were separated. The web surfaces were smooth and web features were formed to high accuracy. There was no warping, twisting, or other distortion of the web after removal from the mold. Some of the webs were subsequently bonded to either paperboard sheets or wood veneer. Considerable stiffness and crush strength were obtained in each of these composite panels.

It is to be understood that the structure of the invention differs considerably from the structure of conventional corrugated boards. The invention relates to structural elements of a particular three-dimensional category. By comparison, corrugated boards contain only two-dimensional structural elements. Corrugated boards have less strength and stiffness across the corrugations compared to along the corrugations. The present invention is capable of producing nearly equal strength and stiffness along the corrugations and across the corrugations because of the unique three-dimensional structure. Simple corrugated medium, without the paperboard facing, cannot be readily stacked to form efficiently-configured rigid three-dimensional trusses, as is the case with the invention disclosed herein. Corrugated medium in common corrugated boards are manufactured by corrugating paper sheets, while the present invention is manufactured by molding three-dimensional elements from a fiber slurry or from dry-fiber furnish mixed with bonding agents. Efficiently engineered structures may be produced using the present invention because the molding operation and three-dimensional structure permit considerable design flexibility.

Novel and Unobvious Features of the Invention

The invention is to be distinguished from other inventions disclosing structural fiberboard products in that it defines an article of manufacture that is a single-piece, three-dimensional fiber web that has the form of a series of corrugations 1 with syncline indentations 4 and anticline protrusions 5 along the length of the corrugations 1. The highpoints or ridges 6 of the web have flat tops to facilitate adhesive bonding between webs in stacked configurations and adhesive bonding to sheets 17 which act as coverings or facings over the webs.

The composite structure formed by the fiber web 19 and sheet facings 17 form a rigid three-dimensional truss that has a high strength-to-weight ratio and a high stiffness-to-weight ratio. Increased strength and stiffness are produced by stacking several webs in a staggered configuration in which the syncline indentations 12 of individual webs 19 are bridged by the corrugation ridges 14. These stacked configurations may also include a variety of sheet facings 17 bonded between webs and to exterior webs in order to provide additional strength and stiffness, and to give the structure desired surface characteristics.

The fiber web structure of the present invention has a decided advantage over prior art disclosures of three-dimensional structural fiberboard products in that the present invention may be molded in a single piece using a simple rigid mold pressed together with one-dimensional pressing forces. Rigid molds can be made extremely durable for long life in demanding mass-production applications. Because of the geometry of the invention, the rigid mold is in close contact with every part of the fiber web as it is pressed. Thereby, surface heat from the mold is effectively transferred to the fiber web, producing rapid drying and requiring less press-time than prior art structures. These combined advantages lead to greatly simplified fabrication hardware, and reduced costs in mass-production.

In addition, the present invention offers a superior solution to the formation of three-dimensional structural fiberboard products, since by using a rigid mold to form the fiber web of the present invention, higher dimensional precision may be achieved. Higher dimensional precision leads to greater strength and makes possible applications requiring close tolerances. High precision also makes possible variation of the thickness of the web in proportion to the magnitude of anticipated mechanical stresses within specific portions of the web. This advantage allows optimization of the strength-to-weight ratio of the web and the panels made with the web for a particular load and load distribution.

Precision molding also makes possible accurate formation of rounded or filleted features in the corners of the web, such as in the corners where the flat valleys 8 meet the sloped surfaces of the web. Rounding or filleting of corners will increase resistance to bending and improve overall strength of the web or panel.

Compared to the resilient mold insert described in the prior art, the use of a rigid mold to form the present invention permits greater control of fiber density and density distribution throughout the fiber web. Improved control of fiber density leads to a higher quality, higher strength final product. In addition, because the mold can be made of high-strength rigid materials, it can be designed to withstand tremendous pressures making production of high-density fiberboard products a possibility.

It is clear that the invention is unobvious since, despite its great advantages, the invention has not been implemented nor disclosed by those skilled in the art of fiberboard production. Numerous disclosures have been made to define methods for the production of other three-dimensional structural fiberboard products, but these products have never been effectively commercialized because their manufacture has entailed complex fabrication procedures and required significant technological breakthroughs.

Manufacture of the invention disclosed herein does not require major new technological developments. This advantage, resulting from the unique structure of the invention which is conducive to simple and reliable manufacturing methods, greatly reduces the start-up risks involved in setting up a manufacturing facility. By reducing the technical risks, widespread acceptance and application of the disclosed three-dimensional structural fiberboard product should occur more readily than has occurred with other three-dimensional structural fiberboard products.

While the invention has been described in detail above, it is to be understood that this is by way of example only and the protection granted is to be limited solely by the spirit of the invention and the scope of the following claims.

I claim:

1. A structural fiberboard product comprising a three-dimensionally molded, single-ply web composed of wood fiber and formed as one piece, wherein said web has a first surface, a spaced second surface, and corrugations, said corrugations including ridges, valleys, syncline indentations, and anticline protrusions, said ridges including substantially flat-topped ridges, said syncline indentations being molded into said wood fiber composing said web and disposed along and indenting into said ridges of said corrugations to a depth greater than approximately 20% of the height of said corrugations, said syncline indentations on said first surface of said web forming anticline protrusions on said second surface of said web and said syncline indentations on said second surface of said web forming anticline protrusions on said first surface of said web, said anticline protrusions bridging across valleys of said corrugations, whereby said corrugations are stiffened and said web is stiffened in directions generally normal to said ridges of said corrugations, and whereby said structural fiberboard product may be molded from a wood-fiber slurry using rigid molds that are pressed together in one direction.

2. The structural fiberboard product of claim 1, including a sheet member joined to said flat-topped ridges, whereby the structure of said fiberboard product becomes a rigid three-dimensional truss, whereby strength and stiffness of said fiber board product are increased, whereby a smooth load-bearing surface is produced, and whereby a display surface is provided.

3. The structural fiberboard product of claim 1, including fillets or chamfers in preselected corners of said web, whereby bending resistance and strength of said web are increased.

4. The structural fiberboard product of claim 1, including a predetermined variation in one or both of wood-fiber thickness and wood-fiber density throughout said web, whereby said web may be strengthened in regions of said web which are exposed to greater stress during use.

5. The structural fiberboard product of claim 1, including a plurality of substantially equally-proportioned web members, wherein each of said web members has the general structure of said web, and said web members are nested and joined together, whereby said fiberboard product has the form of a laminated web, and whereby said fiberboard product has increased strength and rigidity compared to said web, individually.

6. The structural fiberboard product of claim 1, including a plurality of substantially equally-proportioned web members, wherein each of said web members have the general structure of said web, and said web members are joined together along said flat-topped ridges, forming a stack of webs, said stack of webs having exterior webs and edges, whereby said fiberboard product has the form of a rigid three-dimensional truss, and whereby the strength and rigidity of said fiberboard product may be increased over said web, individually.

7. The structural fiberboard product of claim 6, including a sheet member joined to said exterior webs of said stack of webs, whereby stiffness and strength of said structural fiberboard product are increased, whereby a smooth load-bearing surface is formed, and whereby a display surface is provided.

8. The structural fiberboard product of claim 6, including a sheet member joined to said edges of said stack of webs, whereby said fiberboard product has a smooth load-bearing surface and whereby said sheet member prevents intrusion of debris into said stack of webs.

9. The structural fiberboard product of claim 6, including a first sheet member sandwiched between said web members, whereby a fiberboard product is produced having increased strength, rigidity, and heat-transfer resistance compared to said stack of webs, and whereby less positioning accuracy of said web members is required.

10. The structural fiberboard product of claim 9, further including a second sheet member joined to said exterior webs of said stack of webs, whereby a smooth load-bearing surface is formed, and whereby a display surface is provided.

11. The structural fiberboard product of claim 9, further including a second sheet member joined to said edges of said stack of webs, whereby said fiberboard product has a smooth load-bearing surface and whereby said sheet member prevents intrusion of debris into said stack of webs.

\* \* \* \* \*